US012693679B2

(12) United States Patent
Tsuda et al.

(10) Patent No.: US 12,693,679 B2
(45) Date of Patent: Jul. 28, 2026

(54) CONTROL DEVICE, CONTROL METHOD, AND PROGRAM

(71) Applicant: HONDA MOTOR CO., LTD., Tokyo (JP)

(72) Inventors: Kohei Tsuda, Wako (JP); Sango Matsuzaki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 9 days.

(21) Appl. No.: 18/897,308

(22) Filed: Sep. 26, 2024

(65) Prior Publication Data

US 2025/0110502 A1 Apr. 3, 2025

(30) Foreign Application Priority Data

Sep. 29, 2023 (JP) ................................. 2023-170069

(51) Int. Cl.
| | |
|---|---|
| *G05D 1/246* | (2024.01) |
| *G05D 1/646* | (2024.01) |
| *G05D 111/10* | (2024.01) |

(52) U.S. Cl.
CPC ........... *G05D 1/2464* (2024.01); *G05D 1/646* (2024.01); *G05D 2111/10* (2024.01)

(58) Field of Classification Search
CPC .. G05D 1/2464; G05D 1/646; G05D 2111/10; G05D 1/243; G05D 1/622;
(Continued)

(56) References Cited

U.S. PATENT DOCUMENTS

| | | |
|---|---|---|
| 11,409,296 B1 | 8/2022 | Kim et al. |
| 11,429,110 B1 | 8/2022 | Webster et al. |
| | (Continued) | |

FOREIGN PATENT DOCUMENTS

| | | |
|---|---|---|
| JP | 2006-239844 | 9/2006 |
| JP | 2008-047095 | 2/2008 |
| | (Continued) | |

OTHER PUBLICATIONS

Japanese Office Action for Japanese Patent Application No. 2023-170069 mailed May 20, 2025.
(Continued)

*Primary Examiner* — Rodney A Butler

(74) *Attorney, Agent, or Firm* — Amin, Turocy & Watson, LLP

(57) ABSTRACT

A control device includes a recognition part that recognizes a position of an object present around a moving body based on an image obtained by imaging a state around the moving body, an occupancy grid diagram generation part that generates an occupancy grid diagram including a plurality of grid cells based on the position of the object present around the moving body, and a route generation part that generates a route, which the moving body follows, based on the occupancy grid diagram, and the occupancy grid diagram generation part determines whether the object is present for each of the plurality of grid cells in the occupancy grid diagram based on the position of the object present around the moving body, and the occupancy grid diagram generation part expands a first region including a grid cell in which it is determined that the object is present.

10 Claims, 12 Drawing Sheets

(58) Field of Classification Search
CPC ........... G05D 2105/28; G05D 2107/17; G05D
2107/60; G05D 2109/10
See application file for complete search history.

(56)                 References Cited

U.S. PATENT DOCUMENTS

| | | | |
|---|---|---|---|
| 2006/0241827 A1 | 10/2006 | Fukuchi et al. | |
| 2019/0361112 A1 | 11/2019 | Kuhnert et al. | |
| 2020/0073399 A1 | 3/2020 | Tateno et al. | |
| 2020/0097013 A1 | 3/2020 | Sadhu et al. | |
| 2022/0356674 A1* | 11/2022 | Norfleet | G05D 1/0238 |
| 2022/0383749 A1 | 12/2022 | Ishikawa et al. | |
| 2023/0056589 A1* | 2/2023 | Trojahner | B60W 60/0016 |

FOREIGN PATENT DOCUMENTS

| | | |
|---|---|---|
| JP | 2020-038631 | 3/2020 |
| WO | 2021/060018 | 4/2021 |

OTHER PUBLICATIONS

European Search Report for European Patent Application No.
24202858.7 mailed Feb. 5, 2025.

* cited by examiner

CONTROL DEVICE, CONTROL METHOD, AND PROGRAM

CROSS-REFERENCE TO RELATED APPLICATION

Priority is claimed on Japanese Patent Application No. 2023-170069, filed Sep. 29, 2023, the content of which is incorporated herein by reference.

BACKGROUND OF THE INVENTION

Field of the Invention

The present invention relates to a control device, a control method, and a program.

Description of Related Art

In the related art, moving bodies that autonomously move to a preset destination are known. In addition, techniques for creating configuration space maps by creating an occupancy grid map constituted by grid points distributed probabilistically by sensing a distance from an object such as an obstacle or the like, and creating a configuration space map by increasing a thickness of the object in the occupancy grid map based on a radius or a size of a moving body has been proposed (for example, see Japanese Unexamined Patent Application, First Publication No. 2008-47095).

SUMMARY OF THE INVENTION

In the related art, there were cases where a moving body came into contact with an object.

An aspect of the present invention provides an information processing system capable of preventing a moving body from coming into contact with an object.

A control device, a control method, and a program according to the present invention employ the following configurations.

(1) A control device according to an aspect of the present invention is a control device including a recognition part configured to recognize a position of an object present around a moving body on the basis of an image obtained by imaging a state around the moving body; an occupancy grid diagram generation part configured to generate an occupancy grid diagram including a plurality of grid cells on the basis of the position of the object present around the moving body; and a route generation part configured to generate a route, which the moving body follows, on the basis of the occupancy grid diagram, wherein the occupancy grid diagram generation part determines whether the object is present for each of the plurality of grid cells in the occupancy grid diagram on the basis of the position of the object present around the moving body, and the occupancy grid diagram generation part expands a first region including a grid cell in which it is determined that the object is present.

(2) In the aspect of the above-mentioned (1), wherein the occupancy grid diagram generation part detects a corner of the first region, and the occupancy grid diagram generation part expands the corner in the occupancy grid diagram.

(3) In the aspect of the above-mentioned (2), the route generation part generates the route which the moving body follows in a second region that does not include the first region on the basis of the occupancy grid diagram in which the corner has expanded, and a drive controller configured to control a drive device that drives the moving body such that the moving body moves along the route is further provided.

(4) In the aspect of the above-mentioned (2), the occupancy grid diagram generation part expands the corner by disposing a regular polygonal region at a position of the corner.

(5) In the aspect of the above-mentioned (1), the occupancy grid diagram generation part linearly expands the first region by determining that the object is present in a region obtained by connecting a first grid cell and a second grid cell using a straight line when the second grid cell different from the first grid cell, in which it is determined that the object is present, is present in a first range using the first grid cell in which it is determined that the object is present as a center.

(6) In the aspect of the above-mentioned (2), the occupancy grid diagram generation part determines whether a third grid cell is the corner according to a proportion of the first region in a second range using the third grid cell in which it is determined that the object is present as a center.

(7) In the aspect of the above-mentioned (6), the occupancy grid diagram generation part determines that the third grid cell is not the corner when the proportion is equal to or greater than a first threshold and determines that the third grid cell is the corner when the proportion is less than a second threshold smaller than the first threshold, and the occupancy grid diagram generation part obtains a correlation coefficient on the basis of coordinates of each of a plurality of grid cells included in the first region in the second range and determines whether the third grid cell is the corner according to the correlation coefficient when the proportion is less than the first threshold and equal to or greater than the second threshold.

(8) In the aspect of the above-mentioned (2), the occupancy grid diagram generation part determines whether each of a plurality of grid cells over the plurality of frames is the corner or not and detects a grid cell in which a number of times determined to be the corner is equal to or greater than a predetermined number as the corner when the image of the plurality of frames are imaged.

(9) In the aspect of the above-mentioned (2), the route generation part sets a position in the route that becomes a sub-goal, and the occupancy grid diagram generation part expands the corner within a predetermined range from the sub-goal, and does not expand the corner outside the predetermined range from the sub-goal.

(10) In the aspect of the above-mentioned (2), the occupancy grid diagram generation part expands the corner by disposing a regular polygonal region at a position of the corner, and the route generation part incorporates an apex of the regular polygon into the route.

(11) A control method according to an aspect of the present invention is a control method of causing a computer to: recognize a position of an object present around a moving body on the basis of an image obtained by imaging a state around the moving body; generate an occupancy grid diagram including a plurality of grid cells on the basis of the position of the object present around the moving body; generate a route, which the moving body follows, on the basis of the occupancy grid diagram; determine whether the object is present for each of a plurality of grid cells in the occupancy grid diagram on the basis of the position of the object present around the moving body; and expand a first region including a grid cell in which it is determined that the object is present.

(12) A program according to an aspect of the present invention is a program that causes a computer to execute: processing of recognizing a position of an object present around a moving body on the basis of an image obtained by imaging a state around the moving body; processing of generating an occupancy grid diagram including a plurality of grid cells on the basis of the position of the object present around the moving body; processing of generating a route, which the moving body follows. on the basis of the occupancy grid diagram; processing of determining whether the object is present for each of a plurality of grid cells in the occupancy grid diagram on the basis of the position of the object present around the moving body; and processing of expanding a first region including a grid cell in which it is determined that the object is present.

According to the aspects of the above-mentioned (1) to (12), it is possible to prevent the moving body from coming into contact with the object.

DETAILED DESCRIPTION OF THE INVENTION

Hereinafter, embodiments of a control device, a control method, and a program of the present invention will be described with reference to the accompanying drawings. The control device of the present invention controls a drive device of a moving body to move the moving body. The moving body according to the present invention autonomously moves within a region where pedestrians walk. The region where pedestrians walk is a footway, a public open space, a floor in a building, or the like, and may include a roadway. In the following description, it is assumed that no person is on board the moving body, but there is no problem if a person is on board the moving body. The moving body, for example, moves a little ahead of the user while heading towards a pre-given destination, so that other pedestrians that would interfere with the user's movement do not get too close to the user (in other words, it works to create a path for the user). Further, such operations may not be performed constantly, and may be performed temporarily. For example, when the moving body runs parallel to or follows the user and detects a predetermined state (for example, presence of an obstacle or congestion of a traffic situation) in the user's direction of advance, the moving body may temporarily lead the user by executing the algorithm of the present invention.

First Embodiment

Figure 1:
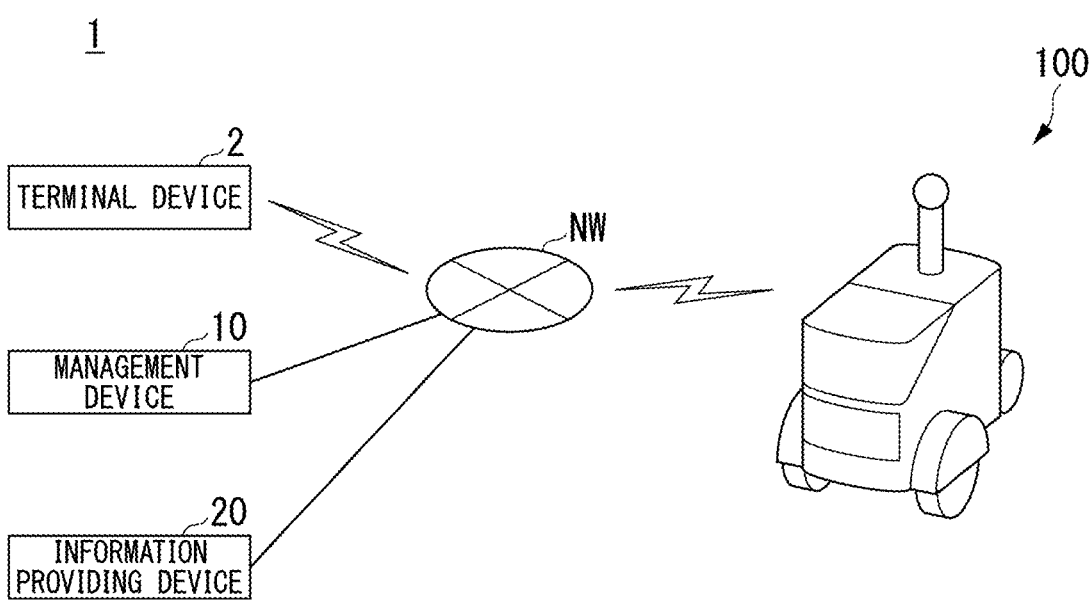
FIG. 1 shows an example of a configuration of a moving body system including a moving body.

FIG. 1 is a view showing an example of a configuration of a moving body system 1 including a moving body 100. The moving body system 1 includes, for example, one or more terminal devices 2, a management device 10, an information providing device 20, and the one or more moving bodies 100. These perform communication via, for example, a network NW. The network NW is an arbitrary network such as a LAN, a WAN, the Internet line, or the like.

[Terminal Device]

The terminal device 2 is a computer device such as a smartphone, a tablet terminal, or the like. For example, on the basis of the user's operations, the terminal device 2 requests permission to use the moving body 100 from the management device 10, and acquires information indicating that the permission to use the moving body 100 has been granted.

[Management Device]

The management device 10 is a computer that grants authority to use the moving body 100 to the user of the terminal device 2 or manages a reservation for use of the moving body 100 in response to a request from the terminal device 2. The management device 10 generates and manages, for example, identification information of users who have been previously registered, and schedule information associated with a reservation date and time of the moving body 100. Further, if there is no need to give authority to users or perform reservation management, the management device 10 may be omitted.

[Information Providing Device]

The information providing device 20 is a computer configured to provide map information to the moving body 100. For example, the information providing device 20 obtains positional information indicating a position of the moving body 100 from the moving body 100, and provides map information that is a map around the moving body 100 to the moving body 100.

[Moving Body]

Figure 2:
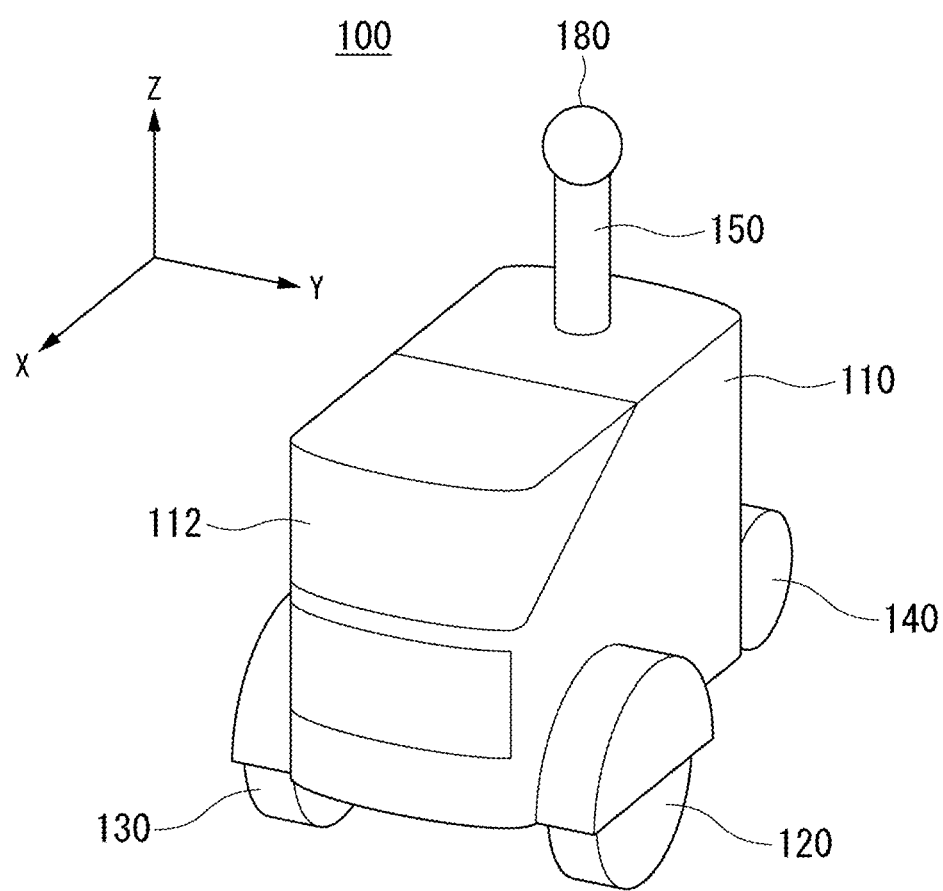
FIG. 2 is a perspective view showing the moving body.

FIG. 2 is a perspective view showing the moving body 100. In the following description, a forward direction of the moving body 100 will be described as a positive x direction, a rearward direction of the moving body 100 will be described as a negative x direction, a leftward direction with reference to the positive x direction in a widthwise direction of the moving body 100 will be described as a positive y direction, and a rightward direction thereof will be described as a negative y direction, and a height direction of the moving body 100 that is a direction perpendicular to the x direction and the y direction will be described as a positive z direction.

The moving body 100 includes, for example, a base body 110, a door part 112 provided on the base body 110, and wheels (a first wheel 120, a second wheel 130 and a third wheel 140) assembled to the base body 110. For example, the user can open the door part 112, and can put luggage into a receiving part provided in the base body 110 and take out the luggage from the receiving part. The first wheel 120 and the second wheel 130 are drive wheels, and the third wheel 140 is a training wheel (driven wheel). The moving body 100 may move using a configuration other than the wheels, such as an endless track or the like.

A columnar support body 150 extending in the positive z direction is provided on the surface of the base body 110 in the positive z direction. A camera 180 configured to image surroundings of the moving body 100 is provided on an end portion of the support body 150 in the positive z direction. A position where the camera 180 is provided may be an arbitrary position different from the position as described above.

The camera 180 is, for example, a camera capable of imaging surroundings of the moving body 100 within a wide angle range (for example, 360 degrees). The camera 180 may include a plurality of cameras. The camera 180 may be implemented by combining, for example, a plurality of 120-degree cameras or a plurality of 60-degree cameras.

Figure 3:
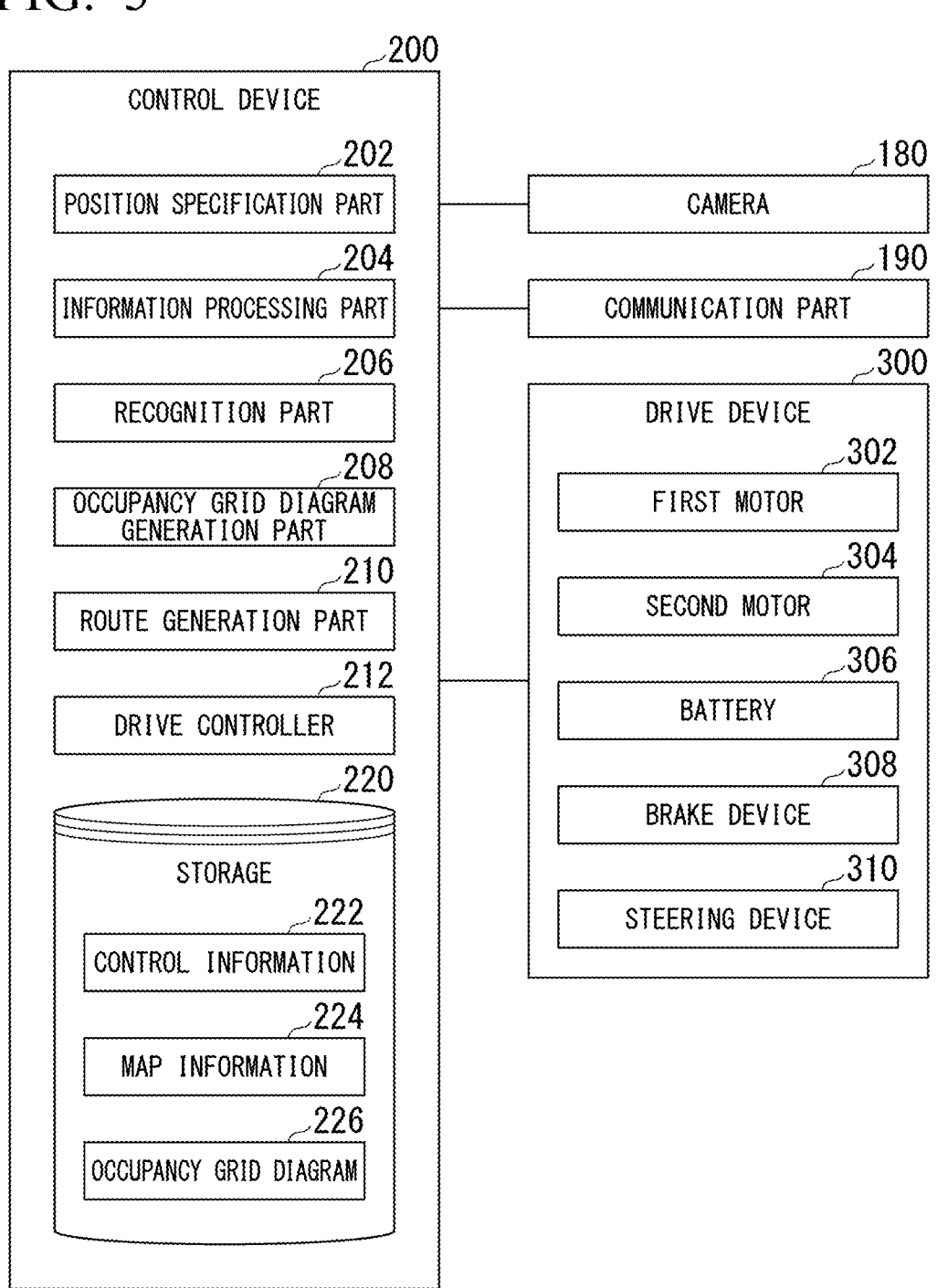
FIG. 3 is a view showing an example of a functional configuration of the moving body.

FIG. 3 is a view showing an example of a functional configuration of the moving body 100. The moving body 100 further includes a communication part 190, a control device 200, and a drive device 300, in addition to the functional configuration shown in FIG. 2. The communication part 190 is a communication interface configured to communicate with the terminal device 2, the management device 10, or the information providing device 20.

[Drive Device]

The drive device 300 includes a first motor 302, a second motor 304, a battery 306, a brake device 308, and a steering device 310. The first motor 302 and the second motor 304 are operated by electric power supplied to the battery 306. The first motor 302 drives the first wheel 120, and the second motor 304 drives the second wheel 130. The first motor 302 may be an in-wheel motor provided on a wheel of the first wheel 120, and the second motor 304 may be an in-wheel motor provided on a wheel of the second wheel 130.

The brake device 308 outputs a brake torque to each wheel on the basis of an instruction of the control device 200. The steering device 310 includes an electrically driven motor. The electrically driven motor changes, for example, a direction of the first wheel 120 or the second wheel 130 by applying a force to a rack and pinion mechanism on the basis of the instruction of the control device 200, and changes a course of the moving body 100.

[Control Device]

The control device 200 includes, for example, a position specification part 202, an information processing part 204, a recognition part 206, an occupancy grid diagram generation part 208, a route generation part 210, a drive controller 212, and a storage 220. The position specification part 202, the information processing part 204, the recognition part 206, the occupancy grid diagram generation part 208, the route generation part 210, and the drive controller 212 are implemented by executing a program (software) using a hardware processor such as a central processing unit (CPU) or the like. Some of all of these components may be implemented by hardware (circuit part; including circuitry) such as large scale integration (LSI), an application specific integrated circuit (ASIC), a field-programmable gate array (FPGA), a graphics processing unit (GPU), or may be implemented by cooperation of software and hardware. The program may be previously stored in a storage device (a storage device including a non-transient storage medium) such as a hard disk drive (HDD), a flash memory, or the like, may be stored in a detachable storage medium (non-transient storage medium) such as a DVD, a CD-ROM, or the like, or may be installed by mounting the storage medium in the drive device.

The storage 220 is implemented by a storage device such as an HDD, a flash memory, a random access memory (RAM), or the like. Information such as control information 222, map information 224, an occupancy grid diagram 226, and the like, are stored in the storage 220. The control information 222 is a control program executed by the drive controller 212 and provided to control a behavior of the moving body 100. The map information 224 is, for example, map information of surroundings of the moving body 100. The occupancy grid diagram 226 is a view including a plurality of grid cells and showing a position where an object is present around the moving body 100. Details of the occupancy grid diagram 226 will be described below.

Further, some or all of the functional configurations included in the control device 200 may be included in another device. For example, the other device and the moving body 100 may communicate and cooperate with each other to control the moving body 100.

The position specification part 202 specifies a position of the moving body 100. The position specification part 202 acquires position information of the moving body 100 using a global positioning system (GPS) device (not shown) installed in the moving body 100. The positional information may be, for example, 2-dimensional map coordinates or latitude and longitude information. In addition, the position specification part 202 may estimate the position of the moving body 100 at the same time as environment map creation using a camera image captured by the camera 180 or a technique such as so-called SLAM using sensors such as Lidar or the like.

The information processing part 204 manages information acquired from the terminal device 2, the management device 10, or the information providing device 20. For example, the information processing part 204 transmits the positional information acquired by the position specification part 202 to the information providing device 20, and thus, acquires the map information 224 that is a map of surroundings of the moving body 100 from the information providing device 20. The information processing part 204 stores the map information 224 acquired from the information providing device 20 in the storage 220.

The recognition part 206 recognizes, for example, a state such as a position of an object present around the moving body 100 (a distance from the moving body 100 and a direction with respect to the moving body 100), a speed, acceleration, and the like, on the basis of the image captured by the camera 180. The object includes a traffic participant, an obstacle present in a facility or a road, or the like. Further, a detection part different from the camera, such as a radar device, LIDAR, or the like, may be provided on the moving body 100. In this case, the recognition part 206 recognizes a state around the moving body 100 using the detection result of the radar device or the LIDAR, instead of (or in addition to) the image.

The occupancy grid diagram generation part 208 generates the occupancy grid diagram 226 including the plurality of grid cells on the basis of the position of the object present around the moving body recognized by the recognition part 206. A specific generation method of the occupancy grid diagram 226 will be described below.

The route generation part 210 grasps a position of a destination designated by a user on the basis of the map information 224. In addition, the route generation part 210 generates the route that the moving body 100 should follow based on the occupancy grid diagram 226 generated by the occupancy grid diagram generation part 208. For example, the route may be generated as a series of plurality of route points arranged and spaced apart by a predetermined distance. The route generation part 210 generates, for example, a route to the destination while avoiding objects in the surroundings.

The drive controller 212 controls the drive device 300 (the first motor 302, the second motor 304, the brake device 308, and the steering device 310) attached to the moving body 100 such that the moving body 100 moves along the route generated by the route generation part 210.

[Generation Processing of Occupancy Grid Diagram]

Figure 4:
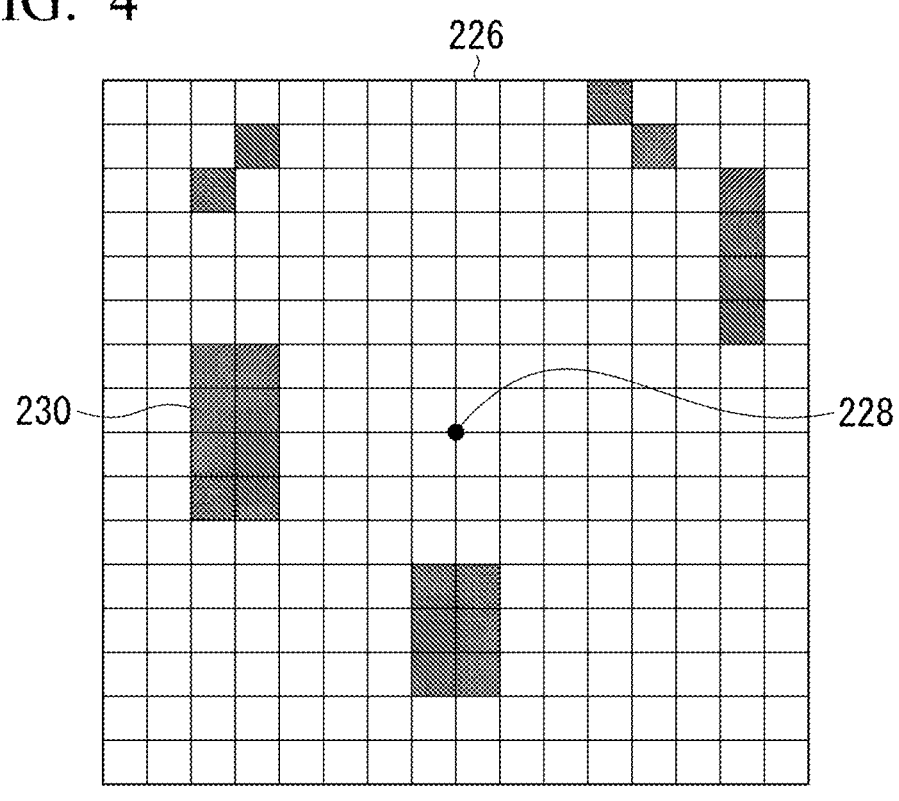
FIG. 4 is a view showing an example of an occupancy grid diagram.

FIG. 4 is a view showing an example of the occupancy grid diagram 226. The occupancy grid diagram 226 is a view including a plurality of grid cells and showing a position where an object is present around the moving body 100. A center 228 of the occupancy grid diagram 226 corresponds to a current location of the moving body 100. The occupancy grid diagram generation part 208 determines whether the object is present for each of the plurality of grid cells in the occupancy grid diagram 226 on the basis of the position of the object present around the moving body recognized by the recognition part 206. In the occupancy grid diagram 226 shown in FIG. 4, a black grid cell 230 is a grid cell in which it is determined that the object is present.

Next, the occupancy grid diagram generation part 208 performs linear expansion processing based on the positions of the plurality of grid cells in which it is determined that the object is present. The linear expansion processing is processing of linearly expanding a first region including a grid cell in which it is determined that the object is present. Hereinafter, the linear expansion processing will be described.

Figure 5:
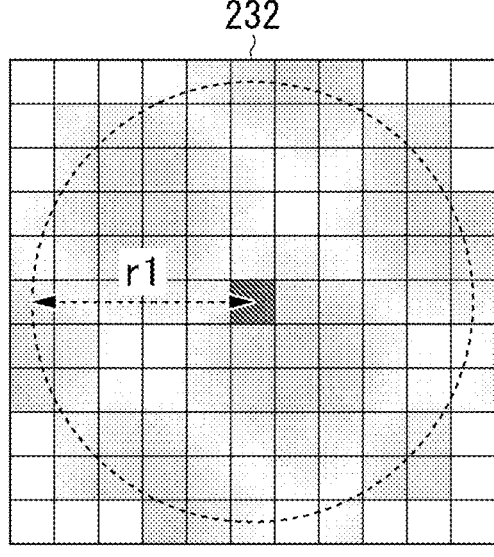
FIG. 5 is a view showing an example of an arrangement for scanning.

FIG. 5 is a view showing an example of an arrangement for scanning 232. The arrangement for scanning 232 is arrangement used for the linear expansion processing. The arrangement for scanning 232 is arrangement showing a region in the first range using the first grid cell in which it is determined that the object is present as a center. In the example of FIG. 5, the arrangement for scanning 232 is arrangement in which the first grid cell in which it is determined that the object is present is set as a center, and a region within a radius r1 from the center (in the first range) is shown. Further, the first range is not limited thereto, and for example, may be a region included in a grid diagram of N×N (N: natural number) using the first grid cell in which it is determined that the object is present as the center.

Specifically, the occupancy grid diagram generation part 208 selects one of a plurality of grid cells 230 in which it is determined that the object is present as a first grid cell, and creates the arrangement for scanning 232 using the first grid cell as a center. Next, the occupancy grid diagram generation part 208 determines whether a second grid cell different from the first grid cell, in which it is determined that the object is present, is present in the created arrangement for scanning 232. Then, when the second grid cell different from the first grid cell, in which it is determined that the object is present, is present in the arrangement for scanning 232, the occupancy grid diagram generation part 208 determines that the object is present in a region obtained by linearly connecting the first grid cell and the second grid cell and linearly expands the first region.

Figure 6:
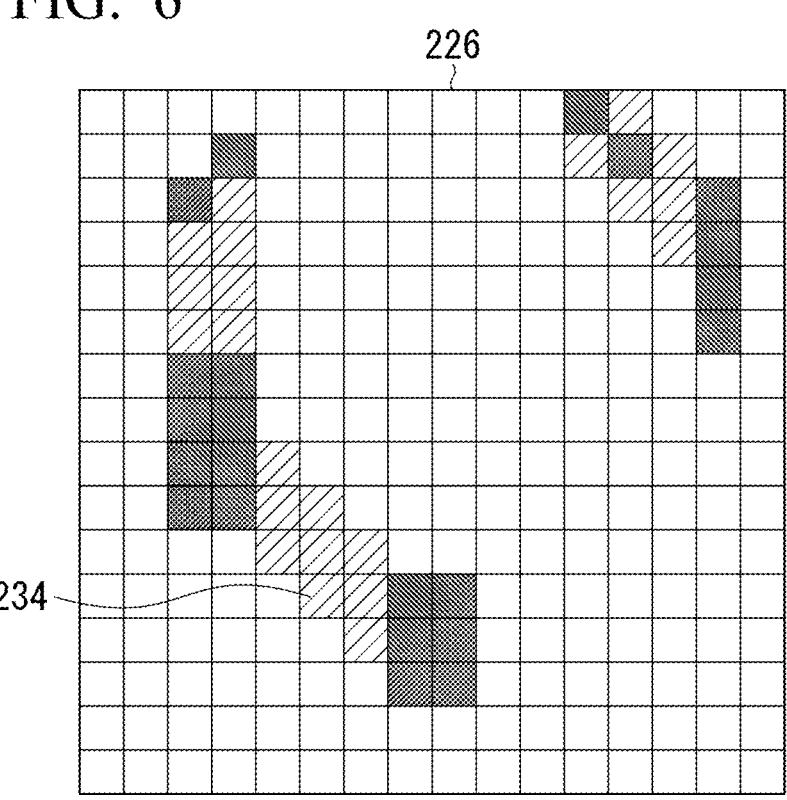
FIG. 6 is a view showing an example of the occupancy grid diagram in which linear expansion processing is performed.

FIG. 6 is a view showing an example of the occupancy grid diagram 226 in which the linear expansion processing is performed. A grid cell 234 is a grid cell of a region expanded by the linear expansion processing. In this way, the occupancy grid diagram generation part 208 determines that the object is present in the region obtained by linearly connecting the first grid cell and the second grid cell when the second grid cell different from the first grid cell, in which it is determined that the object is present, is present in the first range (in the range of the arrangement for scanning 232) using the first grid cell in which it is determined that the object is present as the center, and linearly expands the first region (the region including the grid cell in which it is determined that the object is present). The occupancy grid diagram generation part 208 executes the linear expansion processing for each of the plurality of grid cells in which it is determined that the object is present in FIG. 4. Accordingly, when a distance between the objects is short, it is possible to prevent the moving body 100 from coming into contact with the objects when trying to pass through the gap between the objects.

Next, the occupancy grid diagram generation part 208 executes corner determination processing of determining a corner in the first region (the region including the grid cell in which it is determined that the object is present). Specifically, the occupancy grid diagram generation part 208 determines whether a third grid cell is a corner according to a proportion of the first region (the region including the grid cell in which it is determined that the object is present) in the second range using the third grid cell in which it is determined that the object is present as the center. Hereinafter, the corner determination processing will be described using a specific example.

Figure 7:
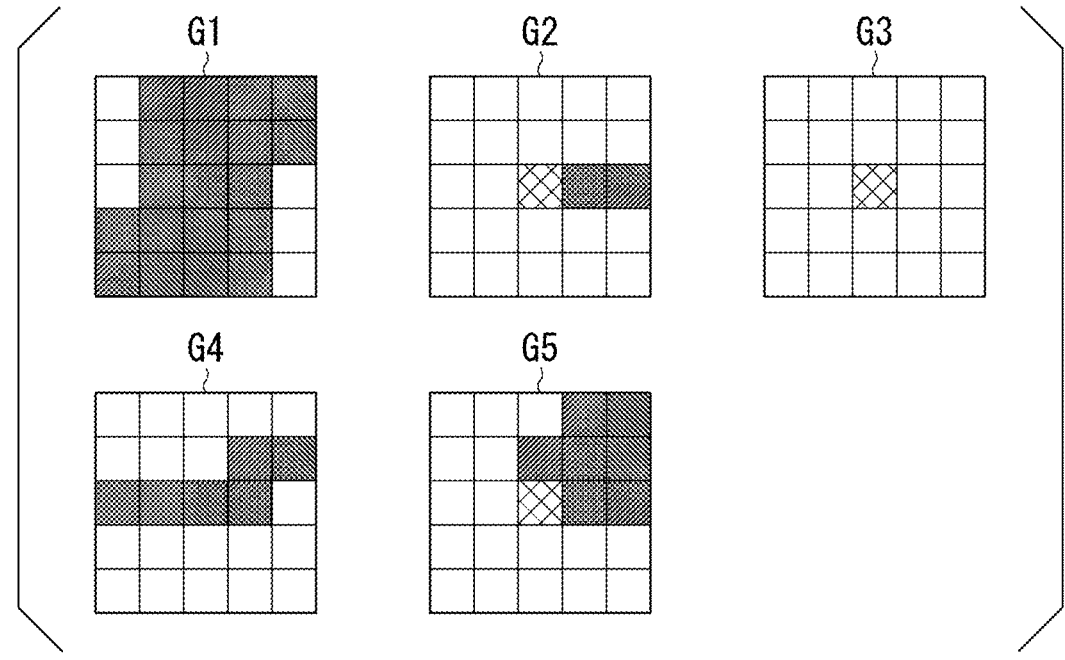
FIG. 7 is a view showing an example of a grid diagram in a second range about a third grid cell.

FIG. 7 is a view showing an example of a grid diagram in the second range using the third grid cell as the center. In the example shown in FIG. 7, the occupancy grid diagram generation part 208 extracts a 5×5 grid diagram using the third grid cell in which it is determined that the object is present as the center from the occupancy grid diagram 226 as the grid diagram in the second range. Further, the second range is not limited thereto, and for example, it may be a region included in a circle of a predetermined radius using the third grid cell as the center.

The occupancy grid diagram generation part 208 determines that the third grid cell is not the corner when a proportion R of the first region in the second range using the third grid cell in which it is determined that the object is present as the center is equal to or greater than a first threshold TH1 (for example, 0.7). For example, in the case of a grid diagram G1 of FIG. 7, it becomes the proportion $R = {}^{19}\!/\!{}_{25} = 0.76$. In this case, since the proportion R is equal to or greater than the first threshold TH1 (0.7), the occupancy grid diagram generation part 208 determines that the third grid cell located at the center of the grid diagram G1 is not the corner. In actuality, the third grid cell located at the center of the grid diagram G1 is surrounded by the grid cells in which it is determined that the object is present in the surroundings, and it is not the corner.

In addition, the occupancy grid diagram generation part 208 determines that the third grid cell is the corner when the proportion R of the first region in the second range using the third grid cell in which it is determined that the object is present as the center is less than a second threshold TH2 (for example, 0.2) smaller than the first threshold TH1. For example, in the case of a grid diagram G2 of FIG. 7, it becomes the proportion R=3/25=0.12. In this case, since the proportion R is less than the second threshold TH2 (0.2), the occupancy grid diagram generation part 208 determines that the third grid cell located at the center of the grid diagram G2 is the corner. In actuality, the third grid cell located at the center of the grid diagram G2 is the corner because it is located at the end portion of the first region.

In addition, for example, in the case of a grid diagram G3 of FIG. 7, it becomes the proportion R=1/25=0.04. In this case, since the proportion R is less than the second threshold TH2 (0.2), the occupancy grid diagram generation part 208 determines that the third grid cell located at the center of the grid diagram G3 is the corner. While the third grid cell located at the center of the grid diagram G3 is not strictly a corner because it is surrounded by the grid cells in which it is determined that the object is not present in the surroundings, it is necessary to perform corner expansion processing, which will be described below, on the third grid cell. For this reason, the occupancy grid diagram generation part 208 also determines that the third grid cell located at the center of the grid diagram G3 is a corner.

In addition, the occupancy grid diagram generation part 208 obtains a correlation coefficient on the basis of coordinates of each of the plurality of grid cells included in the first region in the second range and determines whether the third grid cell is the corner according to the correlation coefficient when the proportion R of the first region in the second range using the third grid cell in which it is determined that the object is present as the center is less than the first threshold TH1 (0.7) and equal to or greater than the second threshold TH2 (0.2).

For example, in the case of a grid diagram G4 of FIG. 7, it becomes the proportion R=6/25=0.24. In this case, since the proportion R is less than the first threshold TH1 (0.7) and equal to or greater than the second threshold TH2 (0.2), the occupancy grid diagram generation part 208 obtains a correlation coefficient on the basis of the coordinates of each of the plurality of grid cells included in the first region in the second range. When the correlation is strong as shown in the grid diagram G4 in FIG. 7, the occupancy grid diagram generation part 208 determines that the third grid cell is not the corner. In actuality, since the third grid cell located at the center of the grid diagram G4 is located on the straight line, it is not the corner.

For example, in the case of a grid diagram G5 of FIG. 7, it becomes the proportion R=8/25=0.32. In this case, since the proportion R is less than the first threshold TH1 (0.7) and equal to or greater than the second threshold TH2 (0.2), the occupancy grid diagram generation part 208 obtains a correlation coefficient on the basis of the coordinates of each of the plurality of grid cells included in the first region in the second range. When the correlation is weak as shown in the grid diagram G5 in FIG. 7, the occupancy grid diagram generation part 208 determines that the third grid cell is the corner.

As described above, the occupancy grid diagram generation part 208 determines whether the third grid cell is the corner of the first region on the basis of the proportion R of the first region in the second range using the third grid cell in which it is determined that the object is present as the center, and the correlation coefficient obtained on the basis of the coordinates of each of the plurality of grid cells included in the first region in the second range. Accordingly, the occupancy grid diagram generation part 208 can accurately determine whether the third grid cell is the corner of the first region. Further, the occupancy grid diagram generation part 208 executes the corner determination processing for each of the plurality of grid cells in which it is determined that the object is present in FIG. 6.

Next, the occupancy grid diagram generation part 208 executes corner detection processing of detecting a corner in the first region (the region including the grid cell in which it is determined that the object is present) on the basis of the result of the corner determination processing. Hereinafter, details of the corner detection processing will be described.

Figure 8:
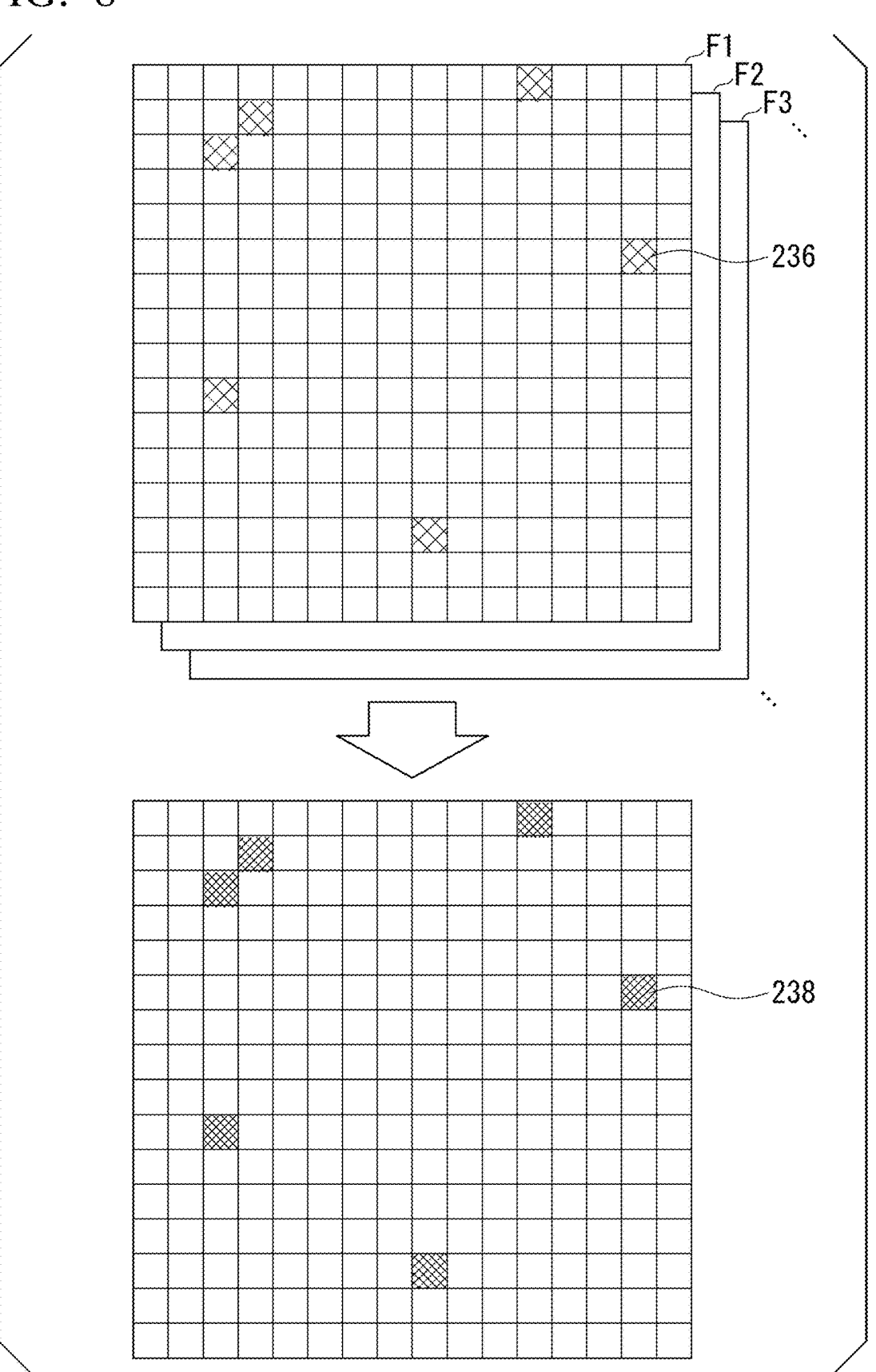
FIG. 8 is a view showing an example of detection processing of corners.

FIG. 8 is a view showing an example of detection processing of the corner. The occupancy grid diagram generation part 208 determines whether it is the corner for each of the plurality of grid cells throughout the plurality of frames when images of the plurality of frames are imaged by the camera 180. As shown in FIG. 8, the occupancy grid diagram generation part 208 acquires a result of the corner determination processing with respect to the occupancy grid diagram 226 corresponding to each frame of a first frame F1, a second frame F2, a third frame F3, . . . . In FIG. 8, a grid cell 236 is a grid cell determined to be a corner in the occupancy grid diagram 226 corresponding to the first frame F1.

The occupancy grid diagram generation part 208 counts the number of times each of the plurality of grid cells included in the occupancy grid diagram 226, which is determined to be a corner, based on the result of the corner determination processing over a plurality of frames. The occupancy grid diagram generation part 208 detects a grid cell whose number of times it has been determined to be a corner is equal to or greater than the predetermined number as a corner of the first region. In FIG. 8, a grid cell 238 is a grid cell showing a corner detected by the occupancy grid diagram generation part 208. In this way, since the occupancy grid diagram generation part 208 detects a corner based on the results of the corner determination processing over a plurality of frames, the corner can be detected with high accuracy.

The occupancy grid diagram generation part 208 expands the corner detected in the occupancy grid diagram 226. The route generation part 210 generates a route that the moving body 100 should follow in the second region that does not include the first region (the region including the grid cell in which it is determined that the object is present) based on the occupancy grid diagram 226 whose corner has been expanded. The drive controller 212 controls the drive device 300 that drives the moving body 100 so that the moving body 100 moves along the route generated by the route generation part 210.

Here, the reason why the occupancy grid diagram generation part 208 expands the corner in the occupancy grid diagram 226 is to prevent the moving body 100 from coming into contact with the object near the corner. The route generated by the route generation part 210 is a series of plurality of route points (a first route point, a second route point, a third route point, . . . ) arranged at a predetermined distance. When the moving body 100 moves toward the first route point, if the moving body 100 approaches the first route point, the route generation part 210 deletes the first route point from the route before the moving body 100 arrives at the first route point. Accordingly, the moving body 100 will move toward the second route point disposed after the first route point.

In this way, the moving body 100 cannot pass through the plurality of route points included in the route generated by the route generation part 210 in the strict sense. For this reason, if the first route point is located near a corner with a small curvature, when the moving direction of the moving body 100 is switched from the first route point to the second route point, there is a possibility that the moving body 100 will contact the object near the corner. Here, in the embodiment, the occupancy grid diagram generation part 208 executes corner expansion processing of expanding the corner detected in the occupancy grid diagram 226.

Figure 9:
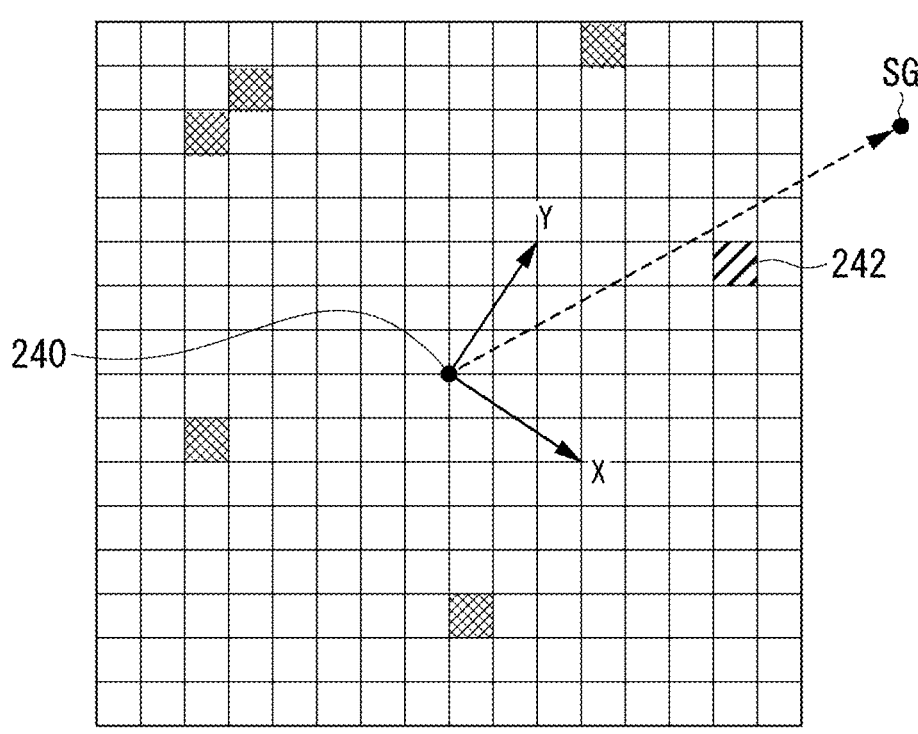
FIG. 9 is a view showing an example of a route which a moving body moves to a sub-goal.

FIG. 9 is a view showing an example of a route which the moving body 100 moves to a sub-goal SG. The route generation part 210 sets the sub-goal SG as a point to be passed through in the route from a current location 240 of the moving body 100 to the destination. Then, the route generation part 210 generates a route which the moving body 100 moves to the sub-goal SG. Here, as shown in FIG. 9, since a corner 242 of the first region (a region that includes a grid cell determined to have an object) exists near the sub-goal SG, the occupancy grid diagram generation part 208 expands the corner 242.

Figure 10:
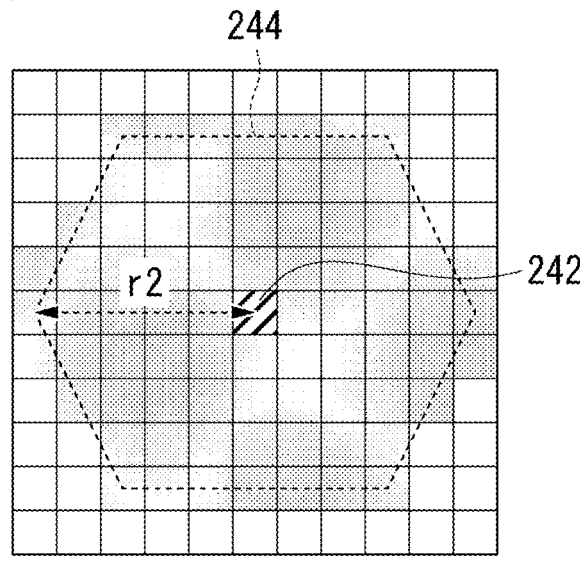
FIG. 10 is a view showing an example of corner expansion processing.

FIG. 10 is a view showing an example of the corner expansion processing. For example, the occupancy grid diagram generation part 208 expands the corner 242 by disposing a regular polygonal region at the position of the corner 242. In the example shown in FIG. 10, the occupancy grid diagram generation part 208 expands the corner 242 by disposing a regular hexagon 244 with a distance r2 from a center to each apex at the position of the corner 242. The regular polygon disposed at the position of the corner 242 is not limited to the regular hexagon, and may be a regular M-gon (M is a natural number of 3 or more). Accordingly, it is possible to prevent the moving body 100 from coming in contact with the object near the corner 242.

Further, when the corner expansion processing is performed for all the corners included in the occupancy grid diagram 226, a processing load of the occupancy grid diagram generation part 208 may be increased. Here, while the occupancy grid diagram generation part 208 expands the corners within the predetermined range from the sub-goal SG, the corner outside the predetermined range from the sub-goal SG is not expanded. Accordingly, it is possible to reduce the processing load of the occupancy grid diagram generation part 208 in the corner expansion processing.

Further, the occupancy grid diagram generation part 208 may perform processing of expanding the first region (the region including the grid cell in which it is determined that the object is present) before performing the corner expansion processing. For example, the occupancy grid diagram generation part 208 may expand the first region in consideration of the size of the moving body 100. Accordingly, it is possible to more reliably prevent the moving body 100 from coming in contact with the object such as an obstacle or the like.

Figure 11:
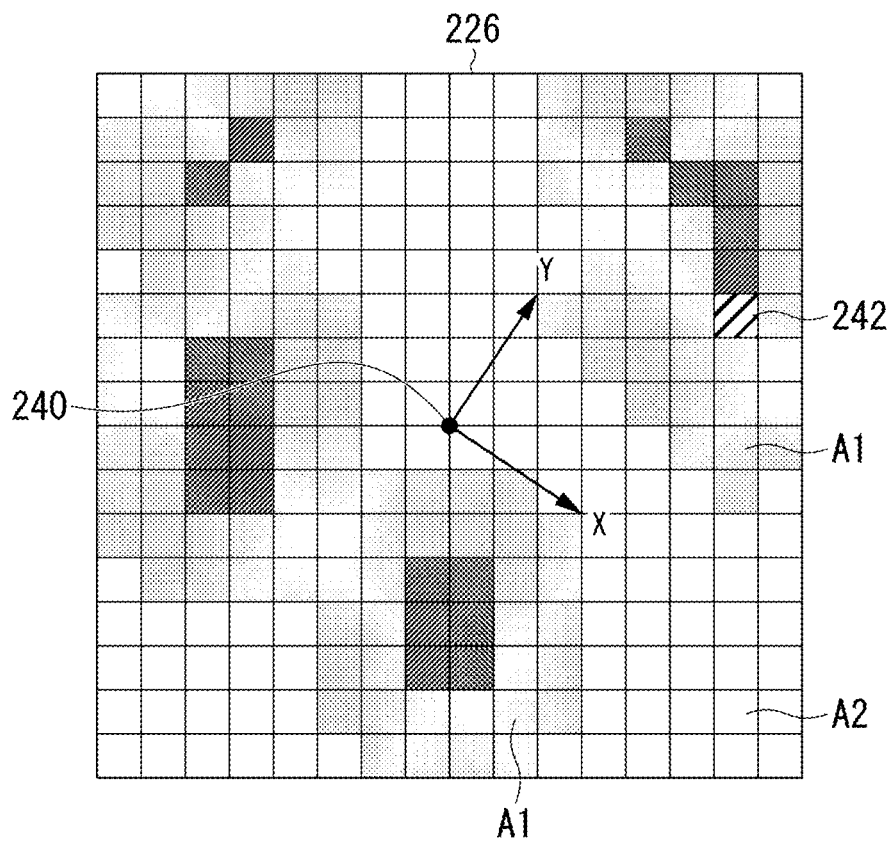
FIG. 11 is a view showing an example of an occupancy grid diagram in which the corner expansion processing is performed while a first region is expanded.

FIG. 11 is a view showing an example of the occupancy grid diagram 226 in which the corner expansion processing is performed while the first region is expanded. Since the number of the grid cells is small in the example of FIG. 11, while the corner expansion processing by the regular hexagon in FIG. 10 is not accurately expressed, the regular hexagon in FIG. 10 is actually disposed at the position of the corner 242.

In addition, as shown in FIG. 11, the plurality of grid cells included in the occupancy grid diagram 226 are classified into a first region A1 (a region including the grid cell in which it is determined that the object is present) and a second region A2 that does not include the first region A1. The route generation part 210 generates a route for the moving body 100 to follow in the second region A2 based on the occupancy grid diagram 226 whose corner has been expanded. The drive controller 212 controls the drive device 300 such that the moving body 100 moves along the route generated by the route generation part 210.

[Flowchart]

Figure 12:
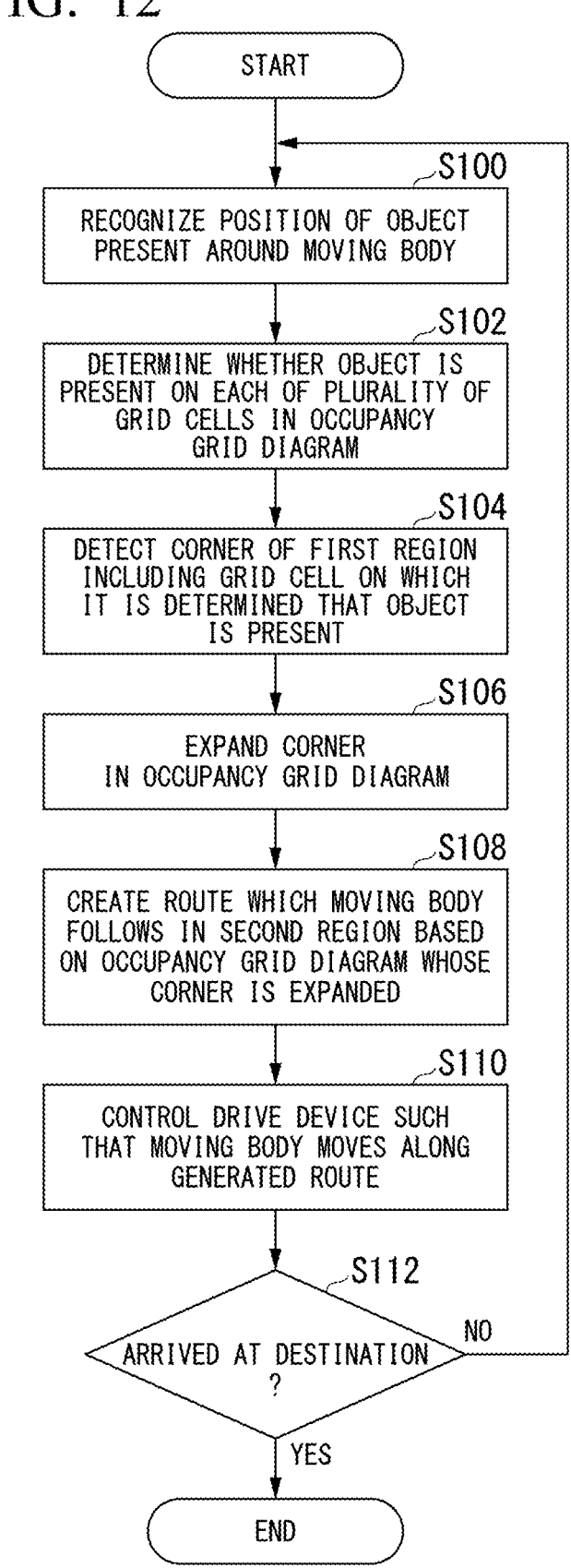
FIG. 12 is an example of a flowchart showing processing executed by a control device.

FIG. 12 is an example of a flowchart showing processing executed by the control device 200. In the processing according to the flowchart, the destination is set by the operation of the user, and the processing is started in response to the instruction of starting the operation of the moving body 100.

In addition, the recognition part 206 recognizes a position of an object present around the moving body 100 on the basis of the image obtained by imaging a state around the moving body 100 (step S100). For example, the recognition part 206 recognizes the position of the object present around the moving body 100 on the basis of the image captured by the camera 180.

Next, the occupancy grid diagram generation part 208 determines whether the object is present in each of the plurality of grid cells in the occupancy grid diagram 226 on the basis of the position of the object present around the moving body 100 (step S102). Accordingly, for example, the occupancy grid diagram 226 shown in FIG. 4 is generated. After that, the occupancy grid diagram generation part 208 performs the linear expansion processing as shown in FIG. 6.

Next, the occupancy grid diagram generation part 208 detects the corner of the first region including the grid cell in which it is determined that the object is present (step S104). Accordingly, for example, the plurality of corners as shown in FIG. 8 are detected.

Next, the occupancy grid diagram generation part 208 expands the corner in the occupancy grid diagram 226 (step S106). For example, the occupancy grid diagram generation part 208 expands the corner by disposing the regular polygon shown in FIG. 10 at the position of the corner.

Next, the route generation part 210 generates a route for the moving body 100 to follow in the second region A2 that does not include the first region A1, based on the occupancy grid diagram 226 whose corner has been expanded (step S108). After that, the drive controller 212 controls the drive device 300 such that the moving body 100 moves along the route generated by the route generation part 210 (step S110).

Next, the control device 200 determines whether the moving body 100 arrives at the destination (step S112). When it is not determined that the moving body 100 arrives at the destination, the control device 200 returns the processing to the above-mentioned step S100. Meanwhile, when it is determined that the moving body 100 arrives at the destination, the control device 200 terminates the processing according to the flowchart.

As described above, the occupancy grid diagram generation part 208 of the embodiment determines whether the object is present for each of the plurality of grid cells in the occupancy grid diagram 226 on the basis of the position of the object present around the moving body 100. In addition, the occupancy grid diagram generation part 208 expands the first region including the grid cell in which it is determined that the object is present. Accordingly, the control device

200 of the embodiment can prevent the moving body 100 from coming in contact with the object.

Second Embodiment

In the above-mentioned first embodiment, the occupancy grid diagram generation part 208 has expanded the corner by disposing the regular polygonal region at the position of the corner. Meanwhile, in the second embodiment, the route generation part 210 generates the route such that the moving body 100 passes through the regular polygonal apex disposed at the position of the corner. Hereinafter, details of the second embodiment will be described.

Figure 13:
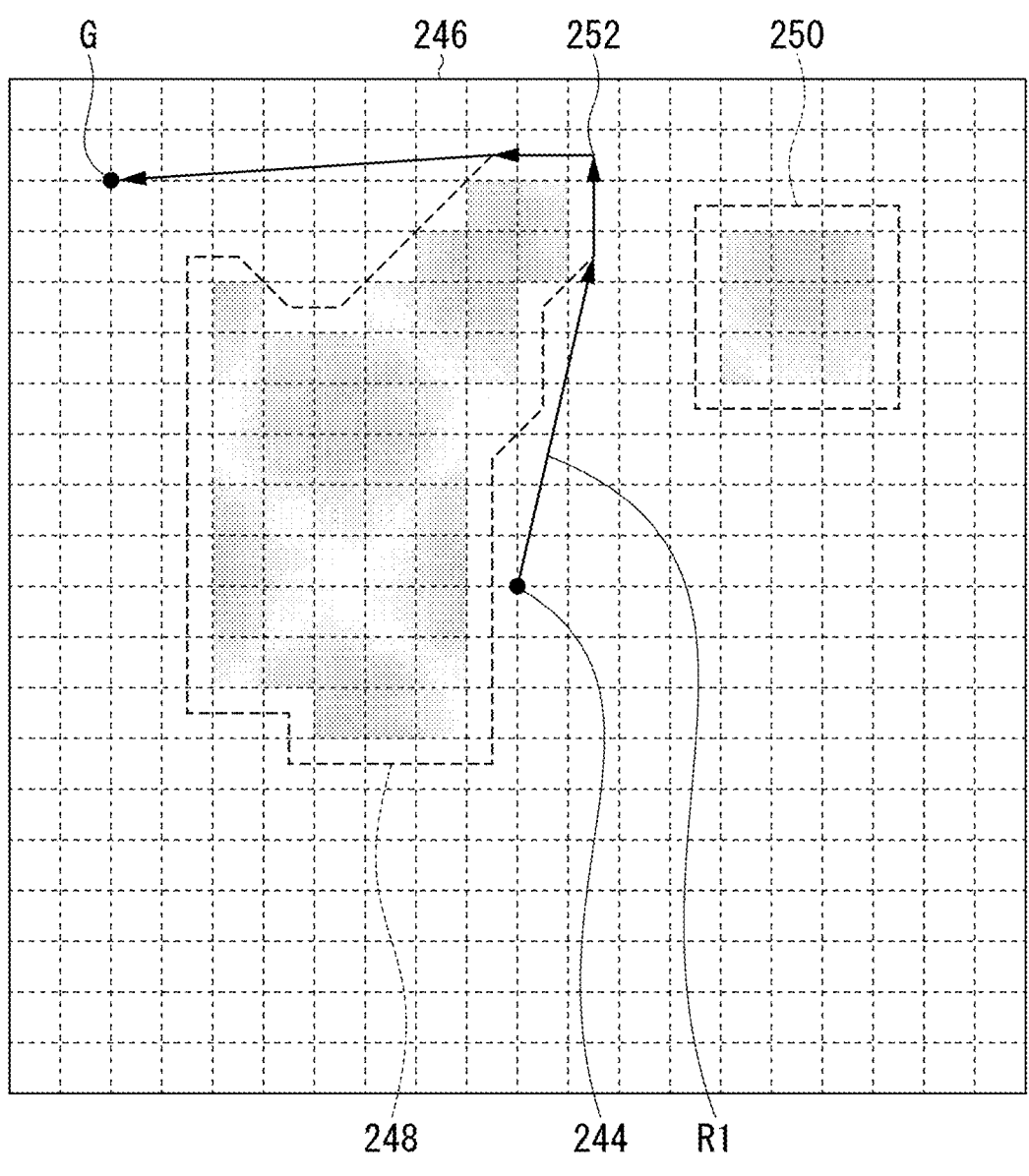
FIG. 13 is a view showing an example of a route to a destination according to a second embodiment.

FIG. 13 is a view showing an example of a route R1 to a destination in the second embodiment. As shown in FIG. 13, in an occupancy grid diagram 246, the grid cell in which it is determined by the occupancy grid diagram generation part 208 that the object is present is surrounded by a first polygon 248 and a second polygon 250. The route generation part 210 does not pass inside the region surrounded by the first polygon 248 and inside the region surrounded by the second polygon 250, and the route R1 having the shortest distance to a destination (goal) G is generated. Further, the route R1 turns to the left at a corner 252 with a small curvature. For this reason, the moving body 100 may come into contact with the object near the corner 252.

Figure 14:
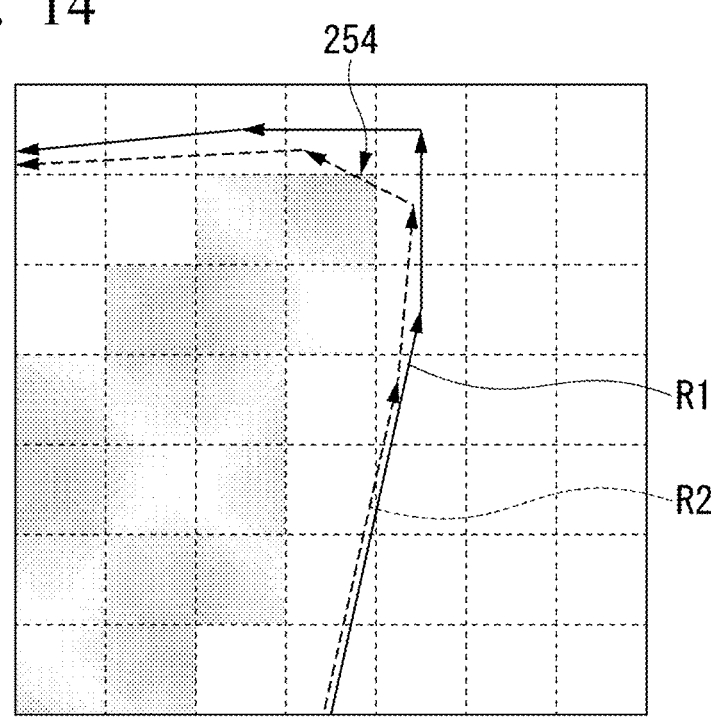
FIG. 14 is an enlarged view of the vicinity of a corner in FIG. 13.

FIG. 14 is an enlarged view of the vicinity of the corner 252 in FIG. 13. In FIG. 14, the route R1 is a route generated by the route generation part 210, and a route R2 is a route through which the moving body 100 passes in actuality. As described above, when the moving body 100 moves toward the first route point included in the route R1, when the moving body 100 approaches the first route point, the route generation part 210 deletes the first route point from the route R1 before the moving body 100 arrives at the first route point. Accordingly, the moving body 100 will move toward the second route point disposed after the first route point.

For this reason, the moving body 100 will not pass through the plurality of route points included in the route R1 in the strict sense, but will move along the route R2. As shown in FIG. 14, the route R2 passes inside the route R1 (on the side of the grid cell in which it has been determined that the object is present). Accordingly, when the moving body 100 moves along the route R2, the moving body 100 may come into contact with the object at a point 254 in FIG. 14. Here, in the embodiment, the occupancy grid diagram generation part 208 detects a corner of a region (first region) surrounded by the first polygon 248, and disposes a regular polygonal region at the position of the corner.

Figure 15:
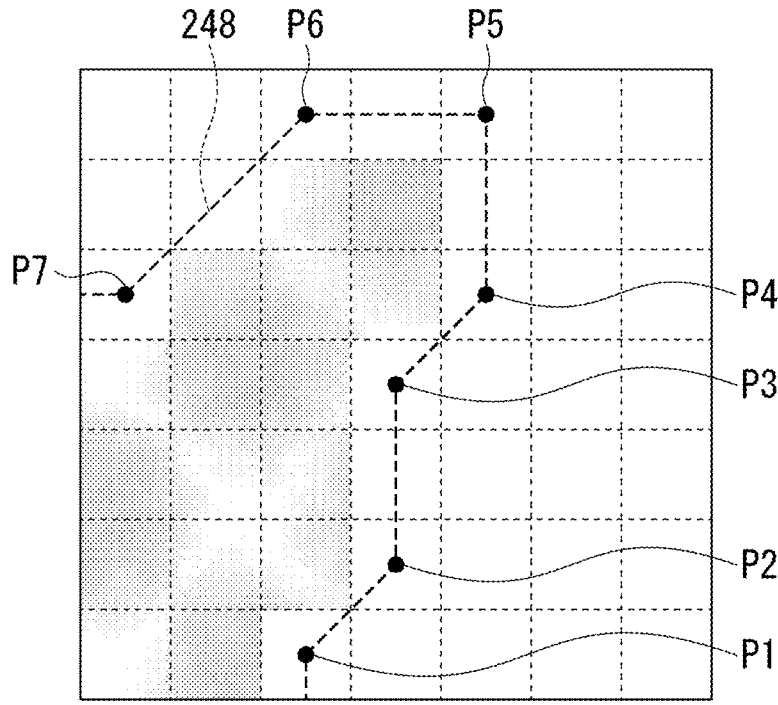
FIG. 15 is a view showing an example of a plurality of grid points on a first polygon.

FIG. 15 is a view showing an example of a plurality of grid points P1 to P7 on the first polygon 248. As shown in FIG. 15, the grid cell in which it is determined by the occupancy grid diagram generation part 208 that the object is present is surrounded by the first polygon 248. The first polygon 248 includes the plurality of grid points P1 to P7. The occupancy grid diagram generation part 208 determines whether it is located at the corner for each of the plurality of grid points P1 to P7.

Figure 16:
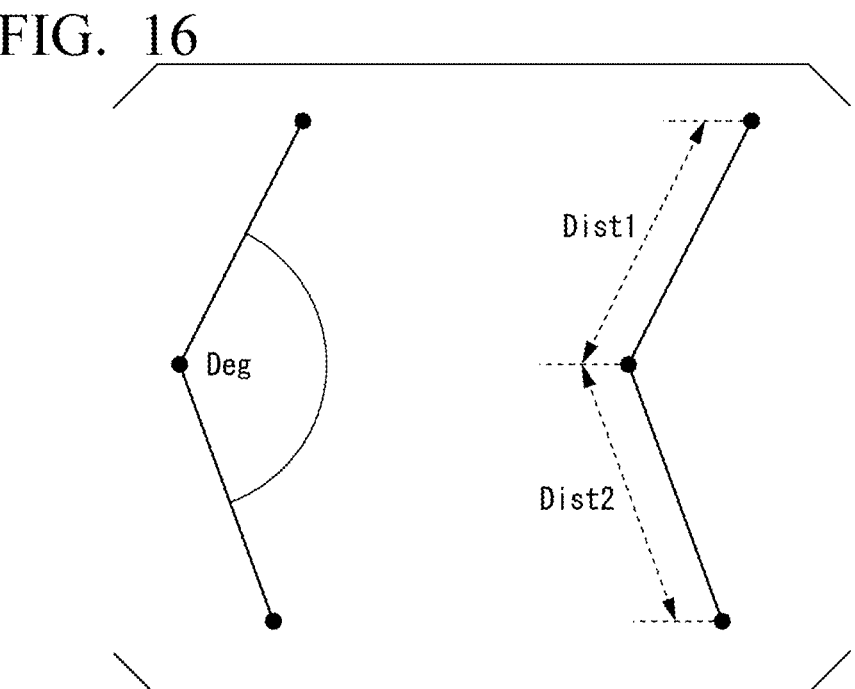
FIG. 16 is a view for describing corner detection processing according to the second embodiment.

FIG. 16 is a view for describing corner detection processing in the second embodiment. The occupancy grid diagram generation part 208 selects one grid point from the plurality of grid points P1 to P7. In addition, the occupancy grid diagram generation part 208 determines whether an angle Deg formed by two sides extending from the selected grid point is equal to or greater than a predetermined angle (for example, 100 degrees). In addition, the occupancy grid diagram generation part 208 determines whether both of lengths Dist1 and Dist2 of the two sides extending from the selected grid point are equal to or smaller than a predetermined length (for example, 1 m).

The occupancy grid diagram generation part 208 determines that the selected grid point is the corner when the angle Deg is equal to or smaller than the predetermined angle and both of the lengths Dist1 and Dist2 of the two sides are equal to or smaller than the predetermined length. For example, in the example shown in FIG. 15, it is determined that a grid point P5 is a corner. After that, the occupancy grid diagram generation part 208 disposes the regular polygonal region at the position of the grid point P5 determined as being located at the corner.

Figure 17:
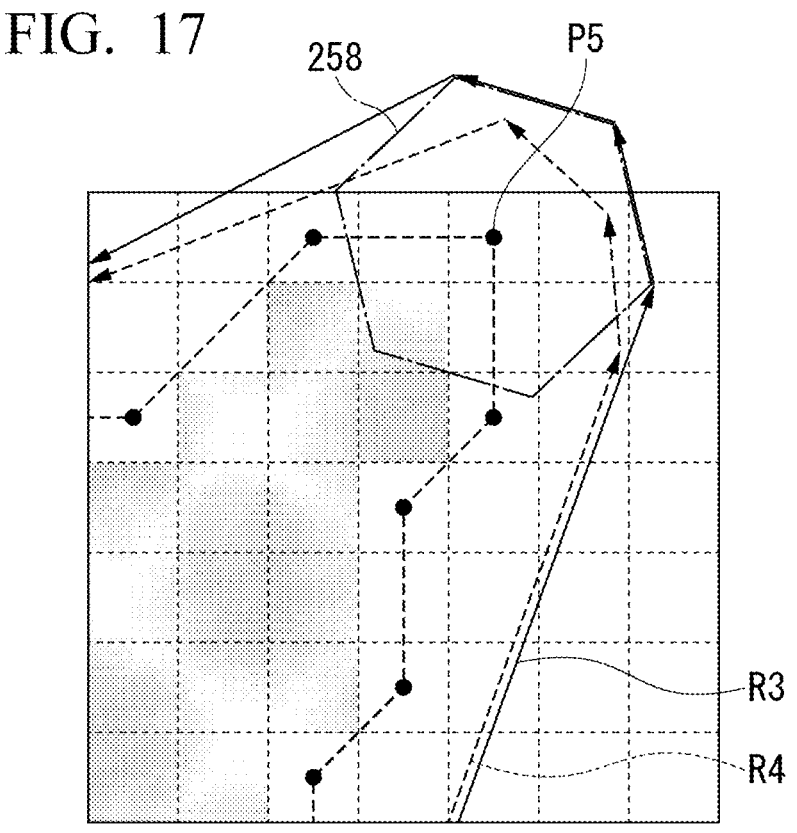
FIG. 17 is a view showing an example of a state in which a region of a regular polygon is disposed at a position of a grid point determined as being located at a corner.

FIG. 17 is a view showing an example of a state in which a regular polygonal region is disposed at a position of the grid point P5 determined as being located at the corner. In the example shown in FIG. 17, a regular hexagonal region 258 is disposed at the position of the grid point P5. The occupancy grid diagram generation part 208 disposes the regular hexagonal region 258 such that a center of a regular hexagon coincides with the grid point P5. In addition, the route generation part 210 incorporates an apex of the regular hexagon disposed at the position of the grid point P5 into a route R3 from a current location 244 of the moving body 100 to the destination G. Further, while the regular polygon disposed at the position of the grid point P5 is a regular hexagon in the embodiment, there is no limitation thereto. For example, the regular polygon disposed at the position of the grid point P5 may be a regular M-gon (M is a natural number or 3 or more).

As shown in FIG. 17, the route R3 generated by the route generation part 210 passes through a part of the outer periphery of the regular hexagonal region 258. Meanwhile, a route R4, through which the moving body 100 actually passes, passes inside the route R3 (on the side of the grid cell in which it is determined that the object is present). However, since the regular hexagonal region 258 is disposed at the position of the corner, even when the moving body 100 moves along the route R4, the moving body 100 does not come into contact with the object near the corner.

As described above, the occupancy grid diagram generation part 208 of the embodiment expands the corner by disposing the regular polygonal region at the position of the corner. In addition, the route generation part 210 incorporates the apex of the regular polygon into the route R3. Accordingly, the control device 200 of the embodiment can prevent the moving body 100 from coming into contact with the corner of the object such as an obstacle or the like with a small curvature.

The above-mentioned embodiment can be expressed as follows.

A control device including:

a storage device in which a program is stored; and a hardware processor, wherein, as the hardware processor executes the program stored in the storage device, the control device recognizes a position of an object present around the moving body on the basis of an image obtained by imaging a state around a moving body, generates an occupancy grid diagram including a plurality of grid cells on the basis of the position of the object present around the moving body, generates a route which the moving body follows on the basis of the occupancy grid diagram, determines whether the object is present for each of the plurality of grid cells in the occupancy grid diagram on the basis of the position of the object present around the moving body, and expands a first region including a grid cell in which it is determined that the object is present.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. A control device comprising:

recognize a position of an object present around a moving body based on an image obtained by imaging a state around the moving body;

generate an occupancy grid diagram including a plurality of grid cells based on the position of the object present around the moving body; and generate a route, which the moving body follows, based on the occupancy grid diagram, wherein the processor is further configured to determine whether the object is present for each of the plurality of grid cells in the occupancy grid diagram based on the position of the object present around the moving body, expand a first region including a grid cell in which it is determined that the object is present;

detect a corner of the first region;

expand the corner in the occupancy grid diagram;

generate the route which the moving body follows in a second region that does not include the first region based on the occupancy grid diagram in which the corner has been expanded; and control a drive device that drives the moving body such that the moving body travels along the route.

2. The control device according to claim 1, wherein the processor expands the corner by disposing a regular polygonal region at a position of the corner.

3. The control device according to claim 1, wherein the processor linearly expands the first region by determining that the object is present in a region obtained by connecting a first grid cell and a second grid cell using a straight line when the second grid cell different from the first grid cell, in which it is determined that the object is present, is present in a first range using the first grid cell in which it is determined that the object is present as a center.

4. The control device according to claim 1, wherein the processor determines whether a third grid cell is the corner according to a proportion of the first region in a second range using the third grid cell in which it is determined that the object is present as a center.

5. The control device according to claim 4, wherein the processor determines that the third grid cell is not the corner when the proportion is equal to or greater than a first threshold and determines that the third grid cell is the corner when the proportion is less than a second threshold smaller than the first threshold, and obtains a correlation coefficient based on coordinates of each of a plurality of grid cells included in the first region in the second range and determines whether the third grid cell is the corner according to the correlation coefficient when the proportion is less than the first threshold and equal to or greater than the second threshold.

6. The control device according to claim 1, wherein the processor determines whether each of a plurality of grid cells over a plurality of frames is the corner or not and detects a grid cell in which a number of times determined to be the corner is equal to or greater than a predetermined number as the corner when the image of the plurality of frames are imaged.

7. The control device according to claim 1, wherein the processor sets a position in the route that becomes a sub-goal, and expands the corner within a predetermined range from the sub-goal, and does not expand the corner outside the predetermined range from the sub-goal.

8. The control device according to claim 1, wherein the processor expands the corner by disposing a regular polygonal region at a position of the corner, and incorporates an apex of the regular polygon into the route.

9. A control method of causing a computer to:

recognize a position of an object present around a moving body based on an image obtained by imaging a state around the moving body;

generate an occupancy grid diagram including a plurality of grid cells based on the position of the object present around the moving body;

generate a route, which the moving body follows, based on the occupancy grid diagram;

determine whether the object is present for each of a plurality of grid cells in the occupancy grid diagram based on the position of the object present around the moving body;

expand a first region including a grid cell in which it is determined that the object is present;

detect a corner of the first region;

expand the corner in the occupancy grid diagram;

generate the route which the moving body follows in a second region that does not include the first region based on the occupancy grid diagram in which the corner has been expanded; and control a drive device that drives the moving body such that the moving body travels along the route.

10. A non-transitory computer-readable medium comprising a program that causes a processor to execute:

processing of recognizing a position of an object present around a moving body based on an image obtained by imaging a state around the moving body;

processing of generating an occupancy grid diagram including a plurality of grid cells based on the position of the object present around the moving body;

processing of generating a route, which the moving body follows, based on the occupancy grid diagram;

processing of determining whether the object is present for each of a plurality of grid cells in the occupancy grid diagram based on the position of the object present around the moving body;

processing of expanding a first region including a grid cell in which it is determined that the object is present;

processing of detecting a corner of the first region;

processing of expanding the corner in the occupancy grid diagram;

processing of generating the route which the moving body follows in a second region that does not include the first region based on the occupancy grid diagram in which the corner has been expanded; and processing of controlling a drive device that drives the moving body such that the moving body travels along the route.

\* \* \* \* \*